(12) United States Patent
Nosley

(10) Patent No.: US 8,139,474 B2
(45) Date of Patent: Mar. 20, 2012

(54) RESOURCE BLOCK SCHEDULING IN COMMUNICATION NETWORKS

(75) Inventor: Michael Nosley, Reading (GB)

(73) Assignee: NEC Corporation, Tokyo (JP)

( * ) Notice: Subject to any disclaimer, the term of this patent is extended or adjusted under 35 U.S.C. 154(b) by 310 days.

(21) Appl. No.: 12/305,551

(22) PCT Filed: Jun. 19, 2007

(86) PCT No.: PCT/JP2007/062650
§ 371 (c)(1),
(2), (4) Date: Dec. 18, 2008

(87) PCT Pub. No.: WO2007/148813
PCT Pub. Date: Dec. 27, 2007

(65) Prior Publication Data
US 2009/0207851 A1   Aug. 20, 2009

(30) Foreign Application Priority Data

Jun. 20, 2006  (GB) .................................. 0612190.9

(51) Int. Cl.
*H04J 11/00* (2006.01)
(52) U.S. Cl. ........................................ 370/210; 370/329
(58) Field of Classification Search ................. 370/330, 370/206, 335, 344, 210, 329; 455/67.14; 375/233, 298
See application file for complete search history.

(56) References Cited

U.S. PATENT DOCUMENTS

| | | | |
|---|---|---|---|
| 7,443,914 B2 * | 10/2008 | Azenkot et al. | 375/233 |
| 2001/0055296 A1 * | 12/2001 | Akiyama | 370/344 |
| 2003/0048799 A1 | 3/2003 | Jang | |
| 2003/0103579 A1 * | 6/2003 | Webster et al. | 375/298 |
| 2004/0114566 A1 | 6/2004 | Lim et al. | |
| 2005/0185573 A1 * | 8/2005 | Albean | 370/206 |
| 2005/0232135 A1 | 10/2005 | Mukai et al. | |
| 2007/0254595 A1 * | 11/2007 | Yoon et al. | 455/67.14 |
| 2009/0232084 A1 * | 9/2009 | Li et al. | 370/330 |
| 2009/0296661 A1 * | 12/2009 | Lee et al. | 370/335 |

FOREIGN PATENT DOCUMENTS

| | | |
|---|---|---|
| EP | 1 204 233 A1 | 5/2002 |
| JP | 2003-158503 A | 5/2003 |
| JP | 2005-294895 A | 10/2005 |

* cited by examiner

*Primary Examiner* — Derrick Ferris
*Assistant Examiner* — Gbemileke Onamuti
(74) *Attorney, Agent, or Firm* — Sughrue Mion, PLLC

(57) ABSTRACT

A method for resource-block allocation, which includes processing OFDM symbol samples to produce complex taps of DFT, selecting the taps forming part of a current resource block allocation and processing the selected taps to provide MAC data. Further, the method includes storing taps that were not previously selected and extracting from the MAC data resource block allocations designating a current sub-frame and subsequently processing the stored taps identified as having the same sub-frame as the allocations extracted from the MAC data, such that scheduling blocks can be included within the same sub-frame as one or more scheduled blocks.

18 Claims, 5 Drawing Sheets

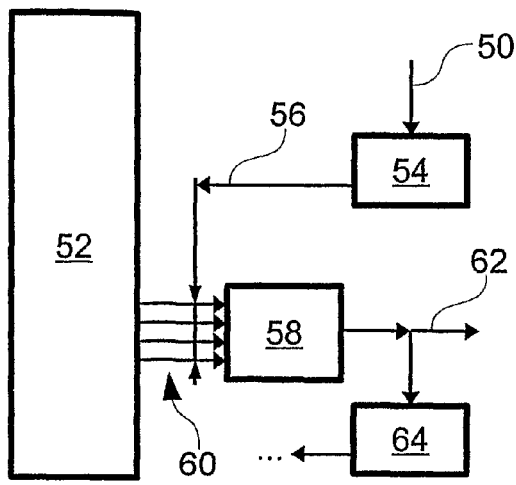

Fig. 4b

| Field | Semantics | New |
|---|---|---|
| ID | Designates the recipient(s) of the allocation | |
| Resource Assignment | Designates some resource blocks (in the frequency dimension) | |
| Duration | Indicates how many sub-frames the above assignment applies for | |
| Time Offset Indication | Defines the starting time of the assignment, relative to the current sub-frame (defaults to the next sub frame) | Yes |

Fig. 5

| 3 bit Time Offset Indication (if it is a standalone field) | Corresponding Time Offset |
|---|---|
| 0 | Instant scheduling |
| 1 | Next sub-frame (default) |
| 2 | Sub-frame after next, or 2 out |
| 3 | 4 out |
| 4 | 8 out |
| 5 | 16 out |
| 6 | 24 out |
| 7 | 32 out |

RESOURCE BLOCK SCHEDULING IN COMMUNICATION NETWORKS

The present invention relates to a method of resource block scheduling within a communications network, and to a related level 1 communications-arrangement.

As is well known, the adoption of Orthogonal Frequency Division Multiple Access (OFDMA) technology for the downlink of Long Term Evolution (LTE) systems requires the standardization of methods for informing the User Equipment (UE) handset which downlink and uplink resource blocks have been assigned thereto. Of course such information itself comprises control information which has to be transmitted to the UE and therefore requires prior resource allocation in order to achieve reliable reception. That this scheduling process has to be initiated from implicit knowledge, since resource blocks allocated to the Broadcast Channel will not need to be explicitly scheduled.

However, dynamic scheduling schemes are also required and will involve the use of resource blocks carrying commands allocating further resource blocks.

All scheduling control information is considered an overhead which disadvantageously takes up some of the capacity of the downlink. While some overhead is inevitable because scheduling must be dynamically defined, the more flexible the scheduling scheme, the more likely the optimal scheduling efficiency can be achieved. Known Universal Mobile Telecommunication system (UMTS) technology used dynamic resource scheduling, for example in HSDPA (HS-DSCH) which has HS-SCCH channels arranged to allocate resources on the different HS-PDSCH channels. The allocation precedes the allocated resource.

However, control signalling still remains a disadvantageously limiting overhead.

The present invention seeks to provide for a method of resource block allocation which can advantageously serve to reduce the overhead otherwise experienced when delivering scheduling, and scheduling control, information over a communications network.

According to a first aspect of the present invention there is provided a method of resource block allocation including processing OFDM symbol samples to produce complex taps of DFT, selecting those of the said taps are forming part of a current resource block allocation and processing the said selected taps to provide MAC data, the method further including the steps of storing taps not so previously selected and extracting from the said MAC data resource block allocations designating the current sub-frame and subsequently processing those of the said stored taps identified as matching the allocations extracted from the said MAC data.

As will be appreciated, the present invention is advantageous in that it allows for the allocation of resources within the same sub-frame as the actual resource block carrying the allocation command. That is, it then becomes possible to remove time delay between the scheduling, and scheduled, resource blocks.

Having this ability advantageously gives greater flexibility to the scheduler in the eNodeB, advantageously allowing it to make use of fragmented resources within a sub-frame or to manage more easily UEs on a long DRX cycle, that is reducing the need to schedule resource blocks one cycle in advance.

As should be appreciated, the invention advantageously implies a method for indicating the time when the allocation applies, for example, next frame or current frame, and which leads to applications in which the time implies a gap between the allocation and the moment it is scheduled, wherein the allocation applies later than the next frame. The provision of a resource block capable of carrying allocation proves particularly advantageous.

Preferably, the initially non-selected taps are stored for the duration of a sub-frame.

Further, the method can advantageously include the provision of allocation commands arranged so as to include an off-set-indication capable of indicating zero-delay between the allocating and allocated resource blocks.

The inclusion of a time off-set indication can prove important insofar as it should remain possible to schedule for the next sub-frame. A particular feature of the invention relates to the use of an off-set indication other than "next" or "now", which would prove sufficient merely for instant scheduling. The possibility for providing other off-set values therefore proves advantageously adaptive.

Also, within the method of the present invention, all downlink resource blocks can be arranged for carrying scheduling commands.

As a further advantage, the allocation command can be arranged to allow for derivation of the identity of one or more recipients from the readership of the resource block carrying the command or by way of the provision of an identifier associated with the allocation command serving to restrict allocation to a target device assigned the same identifier, within the readership of the block carrying the command, This feature is particularly important since it arises from an appreciation that if the readership is already limited, then the identity within the command may be redundant such that its omission will advantageously save resources and without having any limiting affect.

In accordance with a further feature, data blocks arising within the present invention can be arranged to piggy-back further allocations to the same recipients of a sub-set thereof.

Again, if the scope of the readership already fits intended recipients of the allocation, whether a single UE or group thereof, the identifier can advantageously be omitted and further, it is therefore noted that it makes no difference whether the identifier refers to UEs which will not read the block carrying the command. That is, while ten UEs might have been assigned to a sequence of blocks, and half of which belong to a wide group, and then the use of the group address will not refer to the whole group but only to those amongst the ten which are in that group.

Yet further, the invention can provide for piggy-backing with a null-offset so as to advantageously provide for instant scheduling.

As an alternative, piggy-backing allocations including a positive offset, implying later than the next sub-frame, can be provided which advantageously allows for the linking of series allocations into chains.

It should be appreciated that such chaining does not require the off-set to be positive, and it could in fact be zero as indicated later. Such chaining, or piggy-backing, represents a novel approach when employed in combination with an off-set perameter.

Also a short form of the allocation command can be employed and which, for example, can serve to indicate that a command carrying the said indication is to be repeated.

The scheduling command can further be arranged to include a repeat-count serving to initiate repetition of the original allocation command.

According to another aspect of the present invention, there is provided a layer 1 communication device or arrangement including processing means arranged for processing OFDM symbol samples to produce complex taps of DFT and being arranged to select those of the said taps forming part of a current resource block allocation and processing the said selected taps to provide MAC data, wherein the device/arrangement further includes storage means arranged to store taps not so previously selected and to extract from the said MAC data resource block allocations designating a current sub-frame and subsequently processing those of the said stored taps identified as matching the allocations extracted from the MAC data.

As with the method defined above, the storage means can be arranged such that the initially non-selected taps are stored for the duration of a sub-frame.

Processing can advantageously allow for the provision of allocation commands arranged so as to include an off-set-indication capable of indicating zero-delay.

Also, all downlink resource blocks can be arranged for carrying scheduling commands.

Advantageously, the allocation command can be arranged to allow for derivation of the identity of one or more recipients by defining the scope of a command as being the readership of the resource block carrying the command, or by way of the provision of an identifier associated with the allocation command serving to restrict the scope of such an allocation to a target device assigned the same identifier.

In accordance with a further feature, the processing is also arranged such that data blocks arising within the present invention can be arranged to piggy-back further allocations to common recipients. Again, the invention can provide for piggy-backing with a null-offset so as to advantageously provide for instant scheduling. The scheduler can also be arranged, in the alternative, to allow piggy-backing allocations including a positive offset, implying later than the next sub-frame, can be provided which advantageously allows for the linking of series allocations into chains.

The scheduler can further be arranged such that a short-form of the allocation command can be employed and which, for example, can serve to indicate that a command carrying the said indication is to be repeated. The scheduling command can further be arranged to include a repeat count serving to initiate repetition of the original allocation command.

The invention is described hereinafter, by way of example only with reference to the accompanying drawings in which:

FIGS. 4A and 4B illustrate a processing arrangement for OFDM symbol samples according to an embodiment of the present invention;

FIG. 5 is a table illustrating fields arising in an exemplary allocation command according to an embodiment of the present invention;

Figure 1:
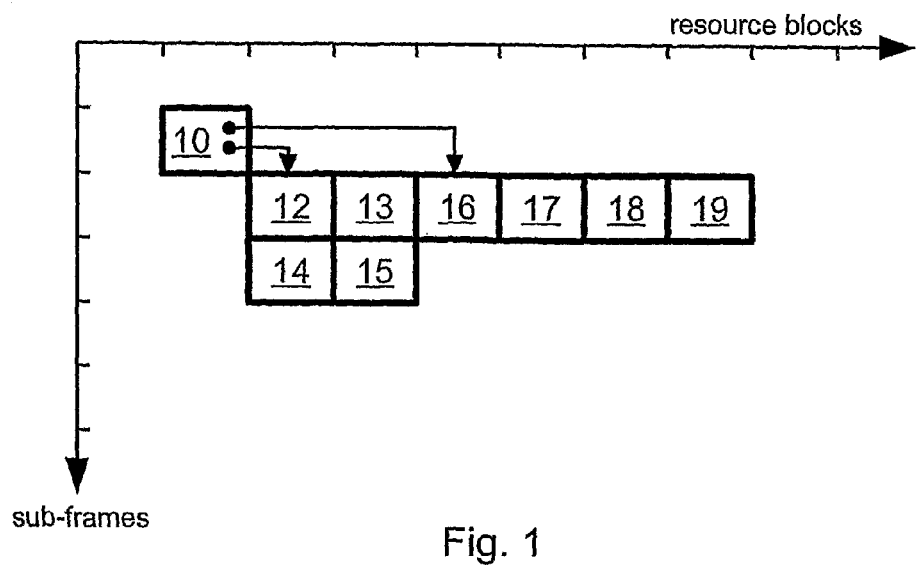
FIG. 1 illustrates a scheduling arrangement for resource blocks according to the current art.

Turning first to FIG. 1, there is provided an illustration of resource block scheduling according to the current state of the art.

Within that drawing, there is illustrated a common control block 10 providing assignments for resource blocks 10-19. The allocations controlled by the control block 10 are indicated by the arrows extending from control block 10 whereby, through the allocation provided by the arrow leading to control block 12, control blocks 12-15 are assigned to a first mobile radio communications device, and by virtue of the arrow extending from control block 10 to resource block 16, resource blocks 16-19 are assigned to the second mobile radio communications device.

As will be appreciated, each sub-frame can be considered as a unit of time and so each of the allocated resource blocks 10-19, arises later than the common control block 10.

Figure 2:
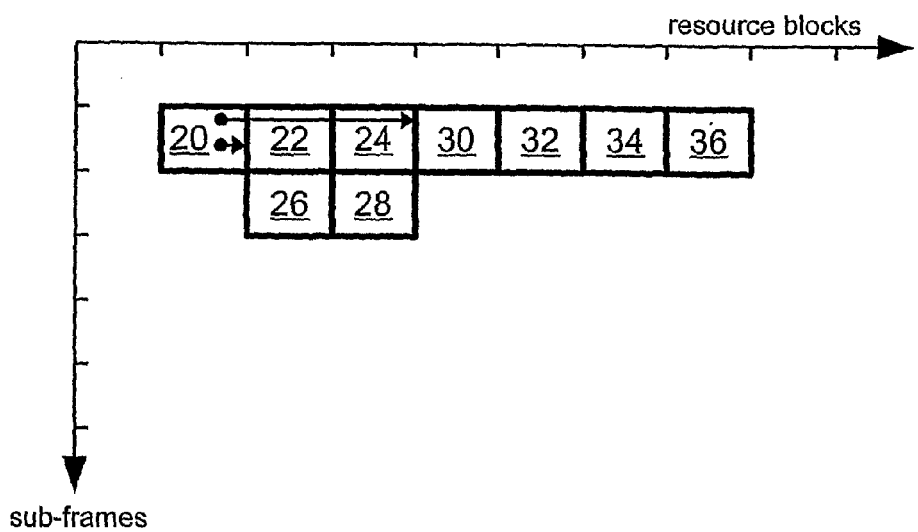
FIG. 2 illustrates a scheduling arrangement according to an embodiment of the present invention.

Turning now however to the advantageous scheduling that can be achieved in accordance with the present invention, reference is made to FIG. 2. Here it will be appreciated that a common control block 20 again provides for the appropriate assignments for the various resource blocks 22-36, with resource blocks 22-28 being assigned to a first mobile radio communications device, and resource blocks 30-36 being assigned to a second mobile radio communications device.

However, and importantly, within the context of the present invention, it will be appreciated that there is no time delay between the common control block, i.e. the scheduling block 20 and the resource blocks, i.e. the scheduled blocks, 22, 24, 30, 32, 34 and 36 which are divided between the first and second mobile radio communications devices and as previously noted.

Through use of the present invention a mobile radio communications device with appropriate processing power, can therefore advantageously be arranged to process resource blocks assigned to them and without anytime delay. The advantages discussed hereinbefore concerning the reduction in scheduling and control information overhead and also improved flexibility for eNodeB schedulers, and indeed for the ease of management of mobile radio communications devices experiencing long Discontinuous Reception (DRX) cycles, can be provided.

Figure 3:
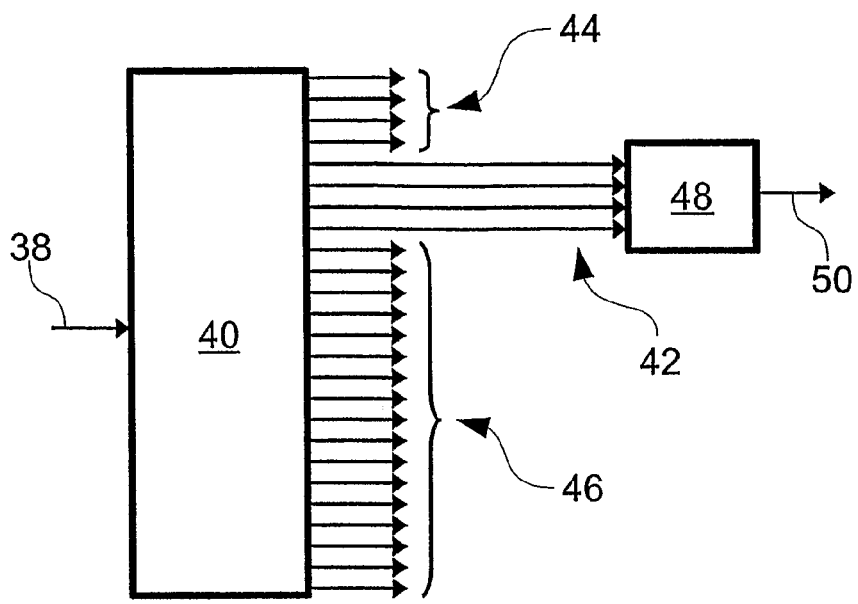
FIG. 3 shows a processing arrangement for OFDM symbol samples according to the current state of the art.

FIG. 3 illustrates computations within a layer 1 communications arrangement according to the current state of the art in which OFDM symbol samples 38 are delivered to digital processing means 40 with FFT functionality so as to produce a plurality of taps 42, 44, 46 some of which, as described further below, are delivered to a demodulation/demultiplexing etc. processor 48 so as to provide MAC data 50.

Received signal processing in the physical layer is usually carried out as a linear process, and, as noted, taking signal samples 38 as input and producing bits 42-46 as output and some 42 of which are fed into the MAC layer as MAC data 50. The OFDMA process involves the computation of bits in the form of complex taps 44-46 output from a processor 40 including a digital Fourier Transform (DFT). Most 44, 46 taps of these are discarded as they correspond to sub-carriers which are not part of the current resource block allocation and it is only those taps 42 for allocated resource block that proceed to the processor 48.

Figure 4A:
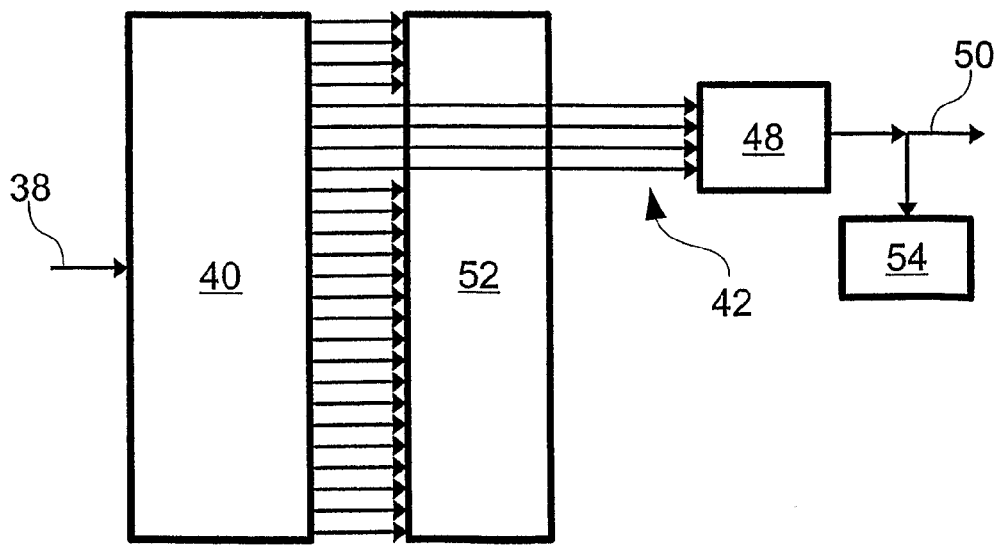

Turning now to FIG. 4A, there is illustrated the first stage of computations arising within an arrangement embodying the present invention and which again illustrates the delivery of OFDM symbol samples 38 to a digital processor 40 for onward delivery of taps to a demodulation/demultiplexing processor 48 for provision of MAC data 50. However, as compared with FIG. 3, it will be appreciated that the non-allocated taps that are not delivered to the demodulation/demultiplexing processor 48 are stored within storage means 52 for subsequent processing in combination with relevant allocations 54 extracted from MAC data 50.

As will be appreciated, the invention involves the storage of these taps for the duration of a sub-frame, that is 6 or 7 symbol with complex number storage, depending on the number of symbols in a sub-frame: (6 or 7)×(DFT size)), in addition to the expected processing of the resource blocks already known to be allocated to the UE.

Turning therefore to FIG. 4B, there is illustrated a subsequent phase in the computations offered according to an embodiment of the present invention and in which the identity of the relevant allocations 54 extracted from the previous MAC data 50 is employed so as to identify those of the taps previously stored within storage means 52 for demodulation/demultiplexing processing 58 for the provision of further MAC data 62 from which further extraction 64 are likewise made. Then, when the MAC layer extracts resource block allocations designating the current sub-frame the process of demodulation, de-multiplexing, etc . . . can be restarted from the matching taps previously stored.

Allocating resource blocks without time delay between the block carrying the allocation and the allocated block(s) need not seek to replace the known method of advance allocation. Since it is appreciated that there has to be an initial block that the UE knows has to be read. In some cases, such as the Broadcast Channel of an LTE cell, all its resource blocks could be scheduled implicitly since the UE will know where and when to find the Broadcast Channel since the standard provides full definition. However, for all services that are set up, scheduling can be provided by a bootstrap mechanism. In this manner, the UE connect initially by a random access procedure. The resources for that are not UE specific and therefore subject to contention in which random message collisions lead to retries and hence delays and efficiency drop, which eventually lead to congestion if there were too many simultaneous random access attempts. Also, in the course of the initial connection, the mobile is assigned uplink and downlink resources so that communication may proceed further without using the random access resources.

Further a relatively small portion of the allocated downlink resources is then used to allocate further resources and so on.

It has been proposed that some, if not all, of the resources which carry allocation messages would be shared between all UEs or a subset of UEs, resulting in the definition of an allocation message comprising an identity of the UE receiving the allocation and the specification of the allocation. 3GPP TR25.814, v1.4.0, section 7.1.1.2.3.1 provides full detail of such a scheduling command.

The present invention can involve the extension of this basic scheduling command in at least one of a variety of ways. As an example resource indication within the downlink scheduling command can be as illustrated in the table of FIG. 5.

Figures 6, 7:
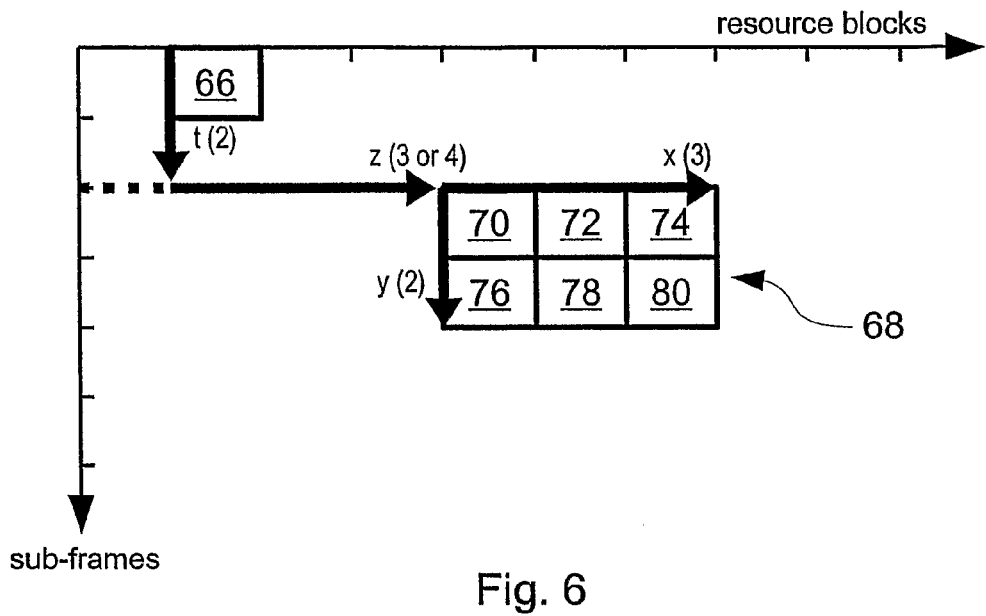
FIG. 6 illustrates resource block allocation according to a further aspect of the present invention.
FIG. 7 is a table illustrating mapping between a time offset indication and the actual off-set experienced in particular in accordance with the embodiment of the present invention illustrated in relation to FIG. 6.

It should of course be appreciated that there are other ways of achieving this. Rather than using an additional field, it might be more efficient to implement a tree-based scheme comprising a method for encoding the Resource Assignment which actually encompasses two dimensions, and merge the Time Offset Indication with the duration of the resource assignment. The quantities which have to be conveyed, either explicitly or implicitly are illustrated in FIG. 6. Here there is illustrated a control block 66 providing for the required assignment and also a patch 68 of connected resource blocks 70-80.

The dashed line in FIG. 6 indicates that quantity z could be relative to the total system bandwidth or relative to the allocating control block. In terms of the fields suggested above it should be appreciated that the resource assignment is a combination of quantities x and z and the duration of the assignment is quantity y. Quantity t is newly employed and could be combined with the other fields, or the duration alone, in a similar fashion as x and z. Then, the functionality illustrated in FIGS. 4a and 4b arises when the Time Offset Indication, whether encoded alone or combined with any of the other fields, corresponds to an effective offset of zero.

An encoding example of a stand alone Time Offset Indication is provided in the table of FIG. 7.

It should be appreciated that there are many reasons why the scheduler should schedule gaps, or in other words, allocate a resource patch comprising a rectangular connected set of resource blocks some time in advance. One reason might be that the scheduling blocks 10, 20, 66 are not scheduled continuously. This might be desirable if they are themselves statically assigned but it is noted that static resources cannot be removed so it is important to keep them to a minimum.

While they could be semi-statically assigned, this requires notifying the UEs concerned when changing the assignment or resorting to broadcasts, that is the information element in the Broadcast Channel.

A further reason for scheduling gaps is naturally introduced if control and data were combined within a resource block. Irrespective of the fact that the Q0S, by way of the modulation and L1 encoding may be lower for data than the ideal for scheduling information and the MAC layer format of LTE could allow control and data, i.e. higher layer transparent content, in a single resource block, or path or resource blocks.

This leads to further possibilities such as the following.

In band re-instated allocation, the burden of repetitively scheduling downlink resources over a long period of time could be removed from the common scheduling blocks by allowing downlink data resource blocks to include the scheduling of further blocks. Moving the scheduling command from the common control block to a dedicated data block leads to advantages in that, with the data block being already assigned to the recipient of the further allocation, the Id field can be omitted completely.

Figure 8:
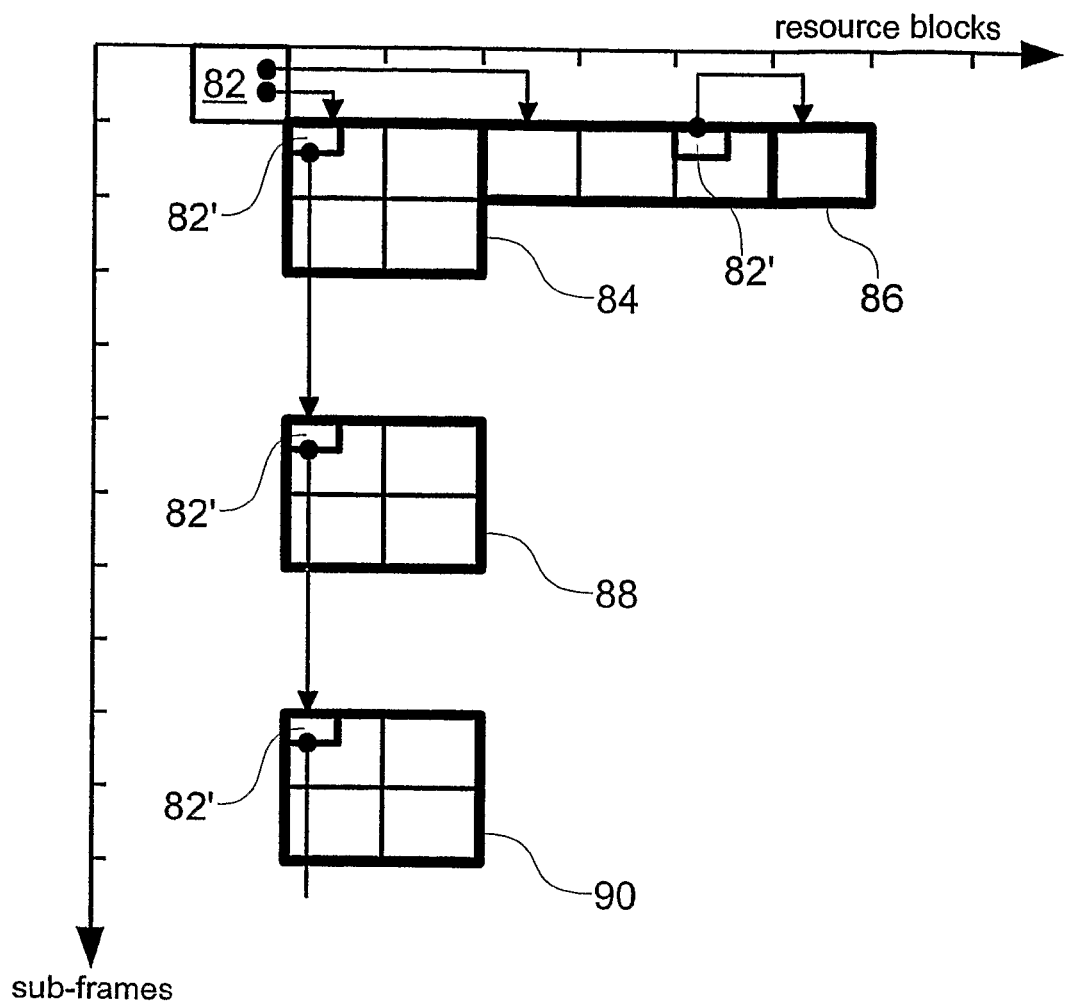
FIG. 8 illustrates resource block scheduling according to a further aspect of an embodiment of the present invention.

Such an arrangement is illustrated in FIG. 8. Here there is illustrated a common control block 82 along with a chain 84, 88, 90 of resource blocks assigned to a first mobile radio communications device, and a series of resource blocks 86 assigned to a second mobile radio communications device. Also illustrated within the FIG. 8 is a repeat factor 82' which can advantageously be applied as described further below.

While it might be thought that there is a risk associated with chained allocations, since missing the block carrying the allocation will break the chain, common scheduling blocks 82' may arrive soon to put the UE back on track. Also, the command can be further extended with a repeat factor requiring that the allocation defined by the other parameters is to be reapplied a number of times along with the related gaps.

Such a repeat factor would be yet another parameter, but the in-band re-instated allocation would be quite small in the first place since most of it is implicit as it could be compressed to an indication meaning "same again". With a repeat factor parameter, each resource patch confirms an allocation within a short horizon and extends the allocation by one patch ahead. The UE could then miss a few patches before running out of allocations. It should be appreciated that this is significantly different from a permanent allocation since the chain can come to an end by simply not renewing the allocations, the repeat factors decrementing to 2, then none, and then a path with no further allocation. Also, the allocated patches can be moved from time to time, by including scheduling commands with different parameters in advance of the change by the size of the horizon. A further option would be to use the common scheduling blocks to indicate the start of new chains.

Such slowly adjustable chained patches of data associated with slow or slower common scheduling blocks are also applicable to multicast MBMS data. The only difference being that the identifiers in the initiating scheduling commands are group identifiers. The data blocks are then shared for reading between all UEs which are receiving the multicast service and the allocations with no identifier will be read by exactly the UEs they apply to.

From the above it will be appreciated that physical layer computations can be organized in such a way to take advantage of OFDMA on the downlink so that scheduling block and scheduled blocks can be simultaneously transmitted.

The basic allocation command can be extended to introduce an offset indication specifying when the allocation starts. To support the above, it can indicate a "no delay" situation, meaning that data is to be extracted from the contents of the sub-frame already received but not yet processed.

One specific application of the invention is the support of a form of DRX (TX from the perspective of the eNodeB, RX from the perspective of the mobile) where the mobile only reads a single sub-frame at fixed intervals. The sub-frame would include a fixed resource block which is always the same and which represents the minimal allocation to a UE or group thereof. The UEs concerned would be allocated further data blocks when needed through no delay allocations.

All downlink resource blocks should be capable of carrying scheduling commands. That means not merely so-called "control blocks" implicitly assigned to the purpose of scheduling, but any block, whether it was implicitly or semi-statically or dynamically scheduled, whether it carries data or not.

The basic allocation command can be logically extended, or as required reduced, so that it does not include any identifier which would otherwise designate the recipient(s) of the allocation. The actual recipient or recipients are derived according to the following requirements.

The scope of an allocation command should be limited to the readership of the resource block carrying it and an identifier associated with an allocation command, if present, should further restrict the allocation to UEs which have been assigned that identifier. It follows that, in the absence of any identifier, the allocation command applies to any UE which already had the carrying block assigned to it. The identifier context may depend on the scheduling block as required by assignment rules. It is worth noting here, however, that the identifier may or may not be shared between different mobiles, i.e. may be individually allocated identities or group identities, such as that of an MBMS multicast group. It should be noted that it will be possible to address UEs which have not been assigned to the block carrying that command and that would result in a waste of resources such as wasted allocation command and wasted assigned resources if not assigned to any other UE.

With all of the above, data blocks can piggy-back further allocations to the same recipients, both in time and in different resource blocks. This advantageously reduces the requirement for common scheduling blocks. Piggy-backing is a case for scheduling commands omitting the identifier. Piggy-backing with a null offset, providing instant scheduling, but indicating a different patch of resource blocks, is a cheaper way to manage non-contiguous allocations.

Through combining piggy-backing with allocations including a positive offset, the allocations can be linked into chains. This differs from a static or semi-static allocation in that it can easily come to an end by not furthering the allocations. N.B. with piggy-backed allocations having an offset of "one", the allocation is continuous and thus not much different from an allocation with a long assignment duration, only it can be much longer than the assignment duration field allows. Also, the duration of the chain need not be known in advance. This also applies to piggy-backed allocations with offsets greater than one, in which case the allocation is discontinuous in time.

The saving in terms of bits used for scheduling can be increased through use of a short-form of the allocation command which indicates that the command which gave access to the patch carrying this indication is to be repeated.

The short-form, and also the long-form, can be further extended with an optional repeat count indicating in a single short piggy-backed allocation command that the original long form is to be repeated a number of times.

The versions of the allocation command with a repeat count could of course be used to further reduce the overall number of scheduling bits, but it could also be used to introduce some redundancy in the allocations of chained allocations, each path allocating a small number of patches in the future and until the end of the chain or a more complex reallocation.

Of course the ability to mix data with signalling should not imply that only a single allocation command per data allocation is permitted. In particular, a short-form and a long-form, each scheduling different blocks, could coexist.

It is likely that the optimal scheduling scheme includes a combination of statically or semi-statically allocated scheduling blocks i.e. conveying allocation commands, and secondary dynamic scheduling which are reached initially via allocations of the first kind. For instance, there might be a pattern of fixed common scheduling blocks, derived from information broadcast on the cell, from which other patches would be allocated, with the option of chaining and/or instant scheduling relative to the common scheduling blocks.

A slow link that serves to keep the UE connected with minimal resource allocation (uplink as well) could be managed with infrequent but fixed scheduling blocks. Instant scheduling could provide extra downlink resource without the scheduler having to involve sub-frames outside of the slow cycle nor having to commit resource blocks far in the future.

Finally, optimized versions of the scheduling command should be defined for trivial cases such as one meaning "same allocation again" and referred to as "the short form" in the above. In general, the implementation will satisfy requirements that: bits indicate the present/absence of the optional field, including values denoting the "short forms"; ID, as before but now optional (no default); resource assignment, as before optionally in short form (no default); time-offset encoded with the duration in a similar way, optional in short form (no default), hardly longer than before when the offset component means "next"; and repeat factor, a new field, optionally defaulting to "no further repeats" but generally present in short forms.

The invention claimed is:

1. A method of resource block allocation comprising:
processing, by a processor, Orthogonal Frequency Division Multiple Access (OFDM) symbol samples to produce complex taps of Digital Fourier Transform (DFT);
selecting, by the processor, first taps, among the produced taps, forming part of a current resource block allocation and processing the selected first taps to provide Media Access Control (MAC) data;
storing second taps among the produced taps that were not previously selected; and
extracting from the MAC data resource block allocations designating the current sub-frame and subsequently processing the stored second taps identified as matching the allocations extracted from the MAC data.

2. A method as claimed in claim 1, wherein the second taps, which are initially non-selected taps, are stored for the duration of a sub-frame.

3. A method as claimed in claim 1, and including the provision of allocation commands arranged so as to include an off-set-indication capable of indicating zero-delay between the allocating and allocated resource blocks.

4. A method as claimed in claim 1, wherein downlink resource blocks are arranged for carrying scheduling commands.

5. A method as claimed in claim 1, wherein an allocation command is arranged to allow for derivation of the identity of one or more recipients from the readership of the resource block carrying the command, or by way of the provision of an identifier associated with the allocation command serving to restrict allocation to a target device assigned the same identifier within the readership of the block carrying the command.

6. A method as claimed in claim 1, wherein data blocks arising are arranged to piggy-back further allocations to the same recipients, or a sub-set thereof.

7. A method as claimed in claim 6 and including piggy-backing allocation with a null-offset so as to provide for instant scheduling.

8. A method as claimed in claim 6 and including piggy-backing allocations including a positive offset so as to allow for the linking of series allocations into chains.

9. A method as claimed in claim 1 and including the provision of a short form of allocation command which can serve to indicate that a command carrying the indication is to be repeated.

10. A method as claimed in claim 9, wherein the scheduling command can further be arranged to include a repeat-count serving to initiate repetition of the original allocation command.

11. A layer 1 communication arrangement comprising:
a processor arranged for processing Orthogonal Frequency Division Multiple Access (OFDM) symbol samples to produce complex taps of Digital Fourier Transform (DFT), selecting first taps, among the produced taps, forming part of a current resource block allocation and processing the selected first taps to provide Media Access Control (MAC) data; and
a storage arranged to store second taps among the produced taps that were not previously selected and to extract from the MAC data resource block allocations designating the current sub-frame and subsequently processing the stored second taps identified as matching the allocations extracted from the MAC data.

12. An arrangement as claimed in claim 11, wherein the storage is arranged to store the second taps, which are initially non-selected taps, for the duration of a sub-frame.

13. An arrangement as claimed in claim 11 and arranged for the provision of allocation commands including an off-set-indication capable of indicating a zero-delay.

14. An arrangement as claimed in claim 11, wherein downlink resource blocks are arranged for carrying scheduling commands.

15. An arrangement as claimed in claim 14 and arranged such that an allocation command allows for derivation of the identity of one or more recipients by way of defining the scope of a command as being the readership of the resource block carrying the command, or by way of the provision of an identifier associated with the allocation command serving to restrict the scope of such an allocation to a target device assigned the same identifier.

16. An arrangement as claimed in claim 11, wherein data blocks are arranged to piggy-back further allocations to common recipients.

17. An arrangement as claimed in claim 16, and arranged to provide for piggy-backing with a null-offset so as to provide for instant scheduling.

18. An arrangement as claimed in claim 16, and arranged to include piggy-backing allocations with a positive offset so as to allow for the linking of series allocations into chains.

* * * * *